(12) United States Patent
Soda et al.

(10) Patent No.: US 11,921,061 B2
(45) Date of Patent: Mar. 5, 2024

(54) ORIENTATION DEGREE DISTRIBUTION CALCULATION METHOD, ORIENTATION DEGREE DISTRIBUTION ANALYZER, AND ORIENTATION DEGREE DISTRIBUTION ANALYSIS PROGRAM

(71) Applicant: NATIONAL INSTITUTE OF ADVANCED INDUSTRIAL SCIENCE AND TECHNOLOGY, Tokyo (JP)

(72) Inventors: Rikio Soda, Aichi (JP); Kimihiro Ozaki, Aichi (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 124 days.

(21) Appl. No.: 17/638,434

(22) PCT Filed: Aug. 11, 2020

(86) PCT No.: PCT/JP2020/030586
§ 371 (c)(1),
(2) Date: Feb. 25, 2022

(87) PCT Pub. No.: WO2021/039379
PCT Pub. Date: Mar. 4, 2021

(65) Prior Publication Data
US 2022/0291153 A1    Sep. 15, 2022

(30) Foreign Application Priority Data
Aug. 30, 2019  (JP) ................................ 2019-158868

(51) Int. Cl.
*G01N 23/2055* (2018.01)

(52) U.S. Cl.
CPC ............................... *G01N 23/2055* (2013.01)

(58) Field of Classification Search
CPC ......................... G01N 23/2055; G01N 23/207
See application file for complete search history.

(56) References Cited

U.S. PATENT DOCUMENTS 6,198,796 B1 *  3/2001  Yokoyama ....... G01N 23/20058
                                              378/81
2003/0235270 A1 * 12/2003 Toraya ................. G01N 23/207
                                              378/73

(Continued)

FOREIGN PATENT DOCUMENTS

JP        2006-258616         9/2006

OTHER PUBLICATIONS

F. K. Lotgering, Topotactical Reactions With Ferrimagnetic Oxides Having Hexagonal Crystal Structures—I J. Inorg. Nucl. Chem., vol. 9, Issue 2, pp. 113-123 (Feb. 1959).

(Continued)

*Primary Examiner* — Dani Fox
*Assistant Examiner* — Soorena Kefayati
(74) *Attorney, Agent, or Firm* — Wenderoth, Lind & Ponack, L.L.P.

(57) ABSTRACT

An orientation degree distribution analysis method includes steps of: inputting, to a main storage device, crystal structure information of an object to be measured, information on an intensity ratio of each diffraction peak and a crystal plane corresponding to each diffraction peak by X-ray diffraction measurement, information on a diffraction range and a diffraction sensitivity, and information on an intensity ratio of each diffraction peak of a randomly oriented sample; calculating an angle defined by an orientation plane and a crystal plane corresponding to a diffraction peak of interest from the information stored in the main storage device;

(Continued)

calculating an existence ratio and storing the existence ratio in the main storage device; setting an orientation degree distribution function; and calculating an orientation degree distribution from the information of the inputting step and the information of the calculating step.

18 Claims, 12 Drawing Sheets

(56) References Cited

U.S. PATENT DOCUMENTS

| | | | | |
|---|---|---|---|---|
| 2004/0168682 | A1* | 9/2004 | Hammer | B28D 5/0088 125/16.01 |
| 2015/0047554 | A1* | 2/2015 | Miyao | C30B 25/02 117/37 |
| 2015/0185167 | A1* | 7/2015 | Miyao | C01B 33/035 117/49 |
| 2015/0276629 | A1* | 10/2015 | Ruf | G01N 23/20075 378/73 |
| 2015/0330918 | A1* | 11/2015 | Kim | H01L 22/12 378/74 |
| 2015/0369760 | A1* | 12/2015 | Penman | G01N 23/203 250/307 |
| 2020/0300788 | A1* | 9/2020 | Yamanaka | G01N 23/2055 |

OTHER PUBLICATIONS

International Centre for Diffraction Data (ICDD) Card No. 00-048-1790—A. Okamoto, Asahi Chemical Industry Co. Ltd. (1997).

R. Soda et al., Numerical simulation of magnetic-aligned compaction with pulsed high magnetic field, Scripta Materialia, vol. 120, pp. 41-44 (Jul. 2016).

R. Soda et al., Simulation-aided development of magnetic-aligned compaction process with pulsed magnetic field, Powder Technology, vol. 329, pp. 364-370 (Apr. 2018).

Y. Matsuura et al., Relation between Nd2Fe14B grain alignment and coercive force decrease ratio in NdFeB sintered magnets, Journal of Magnetism and Magnetic Materials, vol. 336, pp. 88-92 (Jun. 2013).

Y. Matsuura et al., Angular dependence of coercivity in isotropically aligned Nd—Fe—B sintered magnets, AIP Advances, vol. 8, Issue 056236, pp. 1-6 (Feb. 2018).

* cited by examiner (a) α=0.92

(b) α=0.81

(c) α=0.51

(a)

(b)

(c)

ORIENTATION DEGREE DISTRIBUTION CALCULATION METHOD, ORIENTATION DEGREE DISTRIBUTION ANALYZER, AND ORIENTATION DEGREE DISTRIBUTION ANALYSIS PROGRAM

TECHNICAL FIELD

The present invention relates to a technique for calculating a crystal orientation distribution of a sample from an X-ray diffraction profile (in the present specification, the X-ray diffraction profile refers to, for example, a list of diffraction angles corresponding to a certain crystal plane and relative intensities thereof obtained by measurement using an X-ray diffraction (XRD) apparatus, a powder diffraction file (PDF) card issued by the International Centre for Diffraction Data (ICCD), numerical calculation, or the like), and is particularly suitable for calculating an orientation degree distribution of a sample treated such that a certain crystal plane of a permanent magnet or the like is oriented in one direction.

BACKGROUND ART

Some materials have different characteristics depending on a crystal direction in which the material is constituted, and some materials are used by being treated (oriented) so that the crystal direction in the material is oriented in one direction in order to improve the characteristics of the material.

For example, a permanent magnet has an axis of easy magnetization which is easily magnetized depending on a crystal orientation of a material and an axis of difficult magnetization which is hardly magnetized, and it is important to align all directions of the axes of easy magnetization of powder constituting the magnet in one direction in order to maximize performance of the magnet.

An index for evaluating the degree of orientation includes an orientation degree. As a method of evaluating the orientation degree of a permanent magnet, there are a method of measuring magnetic characteristics and calculating the orientation degree from saturation magnetization and residual magnetization, a method of estimating the orientation degree from an X-ray diffraction profile, and a method of directly observing a crystal orientation by an electron back scatter diffraction patterns (EBSD) method.

In a method of measuring an orientation degree a from magnetic characteristics, a saturation magnetization $J_s$ and a residual magnetization $J_r$ of a sample to be measured are measured, and the orientation degree a is determined from Formula (1) below.

[Math. 1]

$$\alpha = \frac{J_r}{J_s} \quad (1)$$

However, in this method, in order to obtain an accurate saturation magnetization, a strong magnetic field (hereinafter, stated as being a magnetic field of 2 T or more) must be applied to the sample, and thus, only the average orientation degree of the entire measurement sample can be ascertained.

As a generally widely used method for estimating the orientation degree from the X-ray diffraction profile, there is a Lotgering method (Non Patent Literature 1). Lotgering factor F is obtained by Formulas (2) to (4) below.

[Math. 2]

$$F = \frac{p - p_0}{1 - p_0} \quad (2)$$

[Math. 3]

$$p = \frac{\sum I(HKL)}{\sum I(hkl)} \quad (3)$$

[Math. 4]

$$p_0 = \frac{\sum I_0(HKL)}{\sum I_0(hkl)} \quad (4)$$

Here, $\Sigma I$ (HKL) and $\Sigma I$ (hkl) are the sum of the peak intensity of the orientation plane and the sum of the X-ray peak intensity of all the crystal planes of the measurement sample, respectively, and $\Sigma I_0$ (HKL) and $\Sigma I_0$ (hkl) are the sum of the peak intensity of the orientation plane and the sum of the X-ray peak intensity of all the crystal planes of a non-orientation sample, respectively. The Lotgering factor of the non-orientation sample is F=0, and the Lotgering factor of a perfect orientation sample is F=1.

In addition, when the orientation degree is obtained using the Lotgering method, a plane other than the orientation plane ((HKL) plane) is treated equally to a plane perpendicular to the orientation plane. Therefore, according to Patent Literature 1, there is a problem in that the orientation degree obtained by the Lotgering method is smaller than the actual orientation degree. According to Patent Literature 1 described above, a method of obtaining an orientation degree close to reality by performing vector correction on diffraction peaks other than the orientation plane has been proposed. However, even when this method is used, it is not possible to calculate the orientation degree distribution with an average orientation degree.

In addition, there is also a problem in that it is difficult to accurately calculate an integral value of all peak intensities in a material having many diffraction peaks and distributed in a wide range of diffraction angles as in a rare earth magnet.

In the above two methods, only the average orientation degree of the entire sample can be evaluated. As a simple evaluation index for controlling the quality of a product, the average orientation degree is an index widely used industrially. However, ascertaining the variation in orientation degree and the existence ratio, which cannot be determined by the average orientation degree and the range of the orientation degree of each portion of the sample is important information for producing a product with a higher orientation degree.

The EBSD method is a method of irradiating a sample with an electron beam and analyzing a crystal orientation from a diffraction pattern of reflected electrons diffracted on a sample surface. By using this method, since the crystal orientation can be directly observed, it is possible to ascertain the orientation degree distribution and the spatial mapping (the spatial mapping of the crystal plane in the present invention refers to a diagram in which the direction of the crystal plane is associated with the position thereof) of the crystal plane. Since the diffracted reflected electrons are emitted from a shallow region of about 50 nm from the sample surface, it is a very surface-sensitive method. Therefore, it is essential that there is almost no damaged layer on the surface of the sample, and when it is necessary to treat the sample surface so as to be very smooth by electrolytic polishing, ion etching, or the like, in particular, when it is necessary to measure a large area, there is a problem in that it takes time to pretreat and measure the sample.

CITATION LIST

Patent Literature

Patent Literature 1: JP 2006-258616 A

Non Patent Literatures

Non Patent Literature 1: F. K. Lotgering. J. Inorg., Nucl. Chem., 9 (1959)
Non Patent Literature 2: ICDD Card No.: 00-048-1790
Non Patent Literature 3: R. Soda et al., Scripta Materialia 120 (2016) 41-44
Non Patent Literature 4: R. Soda et al., Powder Technology 329 (2018) 364-370
Non Patent Literature 5: Y. Matsuura et al., Journal of Magnetism and Magnetic Materials 336 (2013) 88-92
Non Patent Literature 6: Y. Matsuura et al., AIP ADVANCES 8, 056236 (2018)

SUMMARY OF INVENTION

Technical Problem

The present invention has been developed in view of the above problems, and an object of the present invention is to provide a method of easily calculating an orientation degree distribution from an X-ray diffraction profile by using an information processing apparatus and a calculation program without requiring complicated pretreatment of a sample as in an EBSD method, and a method of obtaining a spatial mapping of the orientation degree distribution from a plurality of diffraction intensity maps obtained by using microfocal X-rays.

Solution to Problem

In order to solve the above problems, the present invention provides an orientation degree distribution analysis method that is a method of calculating an orientation degree distribution from a measurement result of X-ray diffraction and information of a crystal structure using an information processing apparatus including a main storage device and a central processing unit (CPU), the method including:
a first step of acquiring crystal structure information of a measurement target, information on an intensity ratio of each diffraction peak and a crystal plane corresponding to each diffraction peak by X-ray diffraction measurement, information on a diffraction range and diffraction sensitivity, and information on an intensity ratio of each diffraction peak and a crystal plane corresponding to each diffraction peak of a randomly oriented sample, and inputting the information to the main storage device;
a second step of calculating an angle formed by an orientation plane and a crystal plane corresponding to a diffraction peak of interest from the information stored in the main storage device in the first step;
a third step of calculating an existence ratio of particles whose crystal planes are oriented in directions corresponding to respective diffraction angles of the randomly oriented sample and storing the existence ratio in the main storage device;
a fourth step of assuming a distribution shape of an orientation degree distribution and setting an orientation degree distribution function; and
a fifth step of calculating the orientation degree distribution based on the information of the first step, the second step, and the third step, and the orientation degree distribution function set in the fourth step.

In addition, the present invention provides an orientation degree distribution analyzer that analyzes an orientation degree distribution from a measurement result of X-ray diffraction and information of a crystal structure using an information processing apparatus including a main storage device and a central processing unit (CPU), the analyzer including:
an acquisition unit that acquires crystal structure information of a measurement target, information on an intensity ratio of each diffraction peak and a crystal plane corresponding to each diffraction peak by X-ray diffraction measurement, information on a diffraction range and diffraction sensitivity, and information on an intensity ratio of each diffraction peak and a crystal plane corresponding to each diffraction peak of a randomly oriented sample, and inputs the information to the main storage device;
an angle calculation unit that calculates an angle formed by an orientation plane and a crystal plane corresponding to the diffraction peak of interest from the information stored by the acquisition unit in the main storage device;
an existence ratio calculation unit that calculates an existence ratio of particles whose crystal planes face in directions corresponding to respective diffraction angles of the randomly oriented sample and stores the existence ratio in the main storage device;
an orientation degree distribution function setting unit that assumes a distribution shape of an orientation degree distribution and sets an orientation degree distribution function; and
an orientation degree distribution analysis unit that calculates the orientation degree distribution based on the information stored in the main storage device and the orientation degree distribution function set in the orientation degree distribution function setting unit.

Furthermore, the present invention provides an orientation degree distribution analysis program for calculating an orientation degree distribution from a measurement result of X-ray diffraction and information of a crystal structure using an information processing apparatus including a main storage device and a central processing unit (CPU), the program causing a computer to execute:
a first step of acquiring crystal structure information of a measurement target, information on an intensity ratio of each diffraction peak and a crystal plane corresponding to each diffraction peak by X-ray diffraction measurement, information on a diffraction range and diffraction sensitivity, and information on an intensity ratio of each diffraction peak and a crystal plane corresponding to each diffraction peak of a randomly oriented sample, and inputting the information to the main storage device;
a second step of calculating an angle formed by an orientation plane and a crystal plane corresponding to a diffraction peak of interest from the information stored in the main storage device in the first step;

a third step of calculating an existence ratio of particles whose crystal planes are oriented in directions corresponding to respective diffraction angles of the randomly oriented sample and storing the existence ratio in the main storage device;

a fourth step of assuming a distribution shape of an orientation degree distribution and setting an orientation degree distribution function; and a fifth step of calculating the orientation degree distribution based on the information of the first step, the second step, and the third step, and the orientation degree distribution function set in the fourth step.

Advantageous Effects of Invention

According to the present invention, it is possible to calculate an orientation degree distribution using an information processing apparatus and a calculation program from information of a crystal structure unique to a material and a plurality of diffraction peak intensities obtained by X-ray diffraction. The spatial map of the orientation degree distribution can be created by obtaining a plurality of diffraction intensity maps using a micro-focal X-ray source.

DESCRIPTION OF EMBODIMENTS

The present invention relates to an orientation degree distribution analysis technique for calculating an orientation degree distribution from crystal structure information of a sample to be measured, an X-ray diffraction profile of a randomly oriented sample, and an X-ray diffraction profile of a sample to be analyzed obtained by measurement using an X-ray diffractometer. Hereinafter, an embodiment of the present invention will be described with reference to the drawings.

(Configuration of Apparatus)

Figure 1:
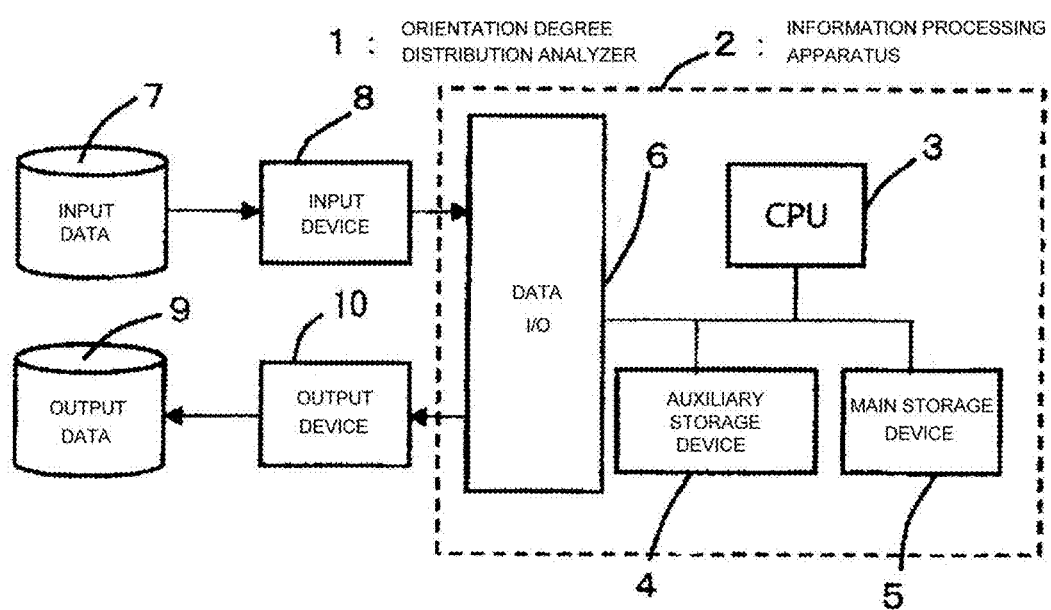
FIG. 1 is a block diagram illustrating an example of a hardware configuration of an orientation degree distribution analyzer.

FIG. 1 is a block diagram illustrating an example of a hardware configuration of an orientation degree distribution analyzer 1. An Information processing apparatus 2 includes a central processing unit (hereinafter, referred to as a CPU) 3 that performs various operations, an auxiliary storage device 4 that stores an analysis program, input data, and an analysis result, a main storage device 5 that stores processing data, and an input/output circuit 6. In addition, an input device 8 that supplies the input data 7 to the storage devices 4 and 5 via the input/output circuit 6, an output device 10 that displays the obtained output result 9, another computer, and the like are connected thereto, as necessary.

Figure 2:
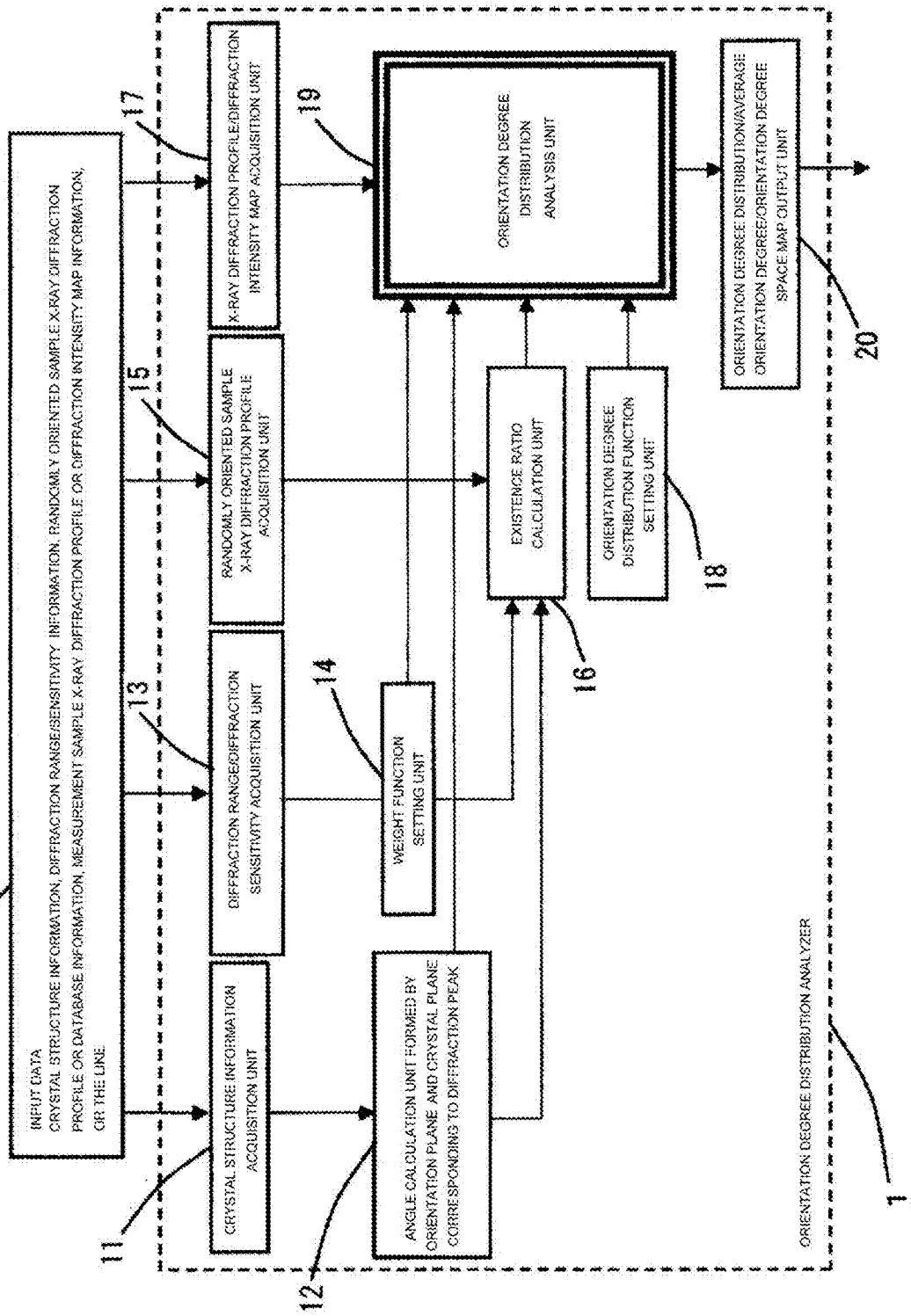
FIG. 2 is a block diagram illustrating a functional configuration of the orientation degree distribution analyzer.

FIG. 2 is a block diagram illustrating a functional configuration of the orientation degree distribution analyzer 1. A calculation program is software that is recorded in a readable storage device such as the auxiliary storage device 4, is read into the main storage device 5 as necessary, and is executed by the CPU 3. In the present specification, the "orientation degree" refers to a value obtained by taking a cosine of an angle ($\varphi_m$) formed by an orientation plane and an actual orientation direction, and the "orientation degree distribution" refers to a distribution of a volume ratio of particles having a certain orientation direction.

(Crystal Structure Information Acquisition Unit)

A crystal structure information acquisition unit 11 acquires crystal structure information of a material as a calculation target of an orientation degree distribution necessary for calculating an angle ($\varphi_m$) formed by an orientation plane and a crystal plane. The crystal structure information is a crystal lattice and its lattice constant. The acquisition of the crystal structure information by the crystal structure information acquisition unit 11 is realized, for example, by the user reading a file recorded in the auxiliary storage device 4 via the input device 8 to the main storage device 5.

(Angle Calculation Unit for Angle formed by Orientation Plane and Crystal Plane corresponding to Diffraction Peak of Interest)

An angle calculation unit 12 for angle formed by an orientation plane and a crystal plane corresponding to a diffraction peak of interest calculates an angle ($\varphi_m$) formed by the orientation plane and the crystal plane corresponding to the diffraction peak of interest from the crystal structure information acquired by the crystal structure information acquisition unit 11. An angle $\varphi_m$ formed by the ($h_1k_1l_1$) plane and the ($h_2k_2l_2$) plane is calculated, for example, by

[Math. 5]

$$\varphi_m = \cos^{-1}\left(\frac{h_1h_2 + k_1k_2 + \frac{1}{2}(h_1k_2 + h_2k_1) + \frac{3}{4}\left(\frac{a}{c}\right)^2 l_1l_2}{\sqrt{\left(h_1^2 + k_1^2 + h_1k_1 + \frac{3}{4}\left(\frac{a}{c}\right)^2 l_1^2\right)\left(h_2^2 + k_2^2 + h_2k_2 + \frac{3}{4}\left(\frac{a}{c}\right)^2 l_2^2\right)}}\right), \quad (5)$$

in the case of a hexagonal crystal system, and by

[Math. 6]

$$\varphi_m = \cos^{-1}\left(\frac{\frac{(h_1 h_2 + k_1 k_2)}{a^2} + \frac{(l_1 l_2)}{c^2}}{\sqrt{\left(\frac{(h_1^2 + k_1^2)}{a^2} + \frac{l_1^2}{c^2}\right)\left(\frac{(h_2^2 + k_2^2)}{a^2} + \frac{l_2^2}{c^2}\right)}}\right) \quad (6)$$

in the case of a tetragonal crystal system, where lattice constants are a, b, and c. Using the above equations, all the diffraction angles used to obtain the orientation degree distribution are calculated using the CPU 3 and stored in the main storage device 5.

(Diffraction Range/Diffraction Sensitivity Acquisition Unit)

The diffraction peak observed in the XRD measurement is ideally observed only when the Bragg condition is satisfied, that is, when the angle of the X-ray incident on the crystal plane is the Bragg angle, but in practice, reflection is observed even at an angle slightly deviated from the Bragg angle (here, stated as an angle of 10° or less therefrom) due to crystallinity of the measurement sample, and thus it is necessary to take this into consideration in the analysis in the present invention. A diffraction range/diffraction sensitivity acquisition unit 13 acquires diffraction intensity information obtained at an angle slightly shifted from a diffraction angle θ corresponding to a certain crystal plane. This information is obtained, for example, by preparing a sample in which a target sample raw material powder is almost completely oriented and measuring the rocking curve of the sample. The acquisition of the diffraction intensity information by the diffraction range/diffraction intensity acquisition unit 13 is realized, for example, by the user reading a file recorded in the auxiliary storage device 4 via the input device 8 to the main storage device 5.

(Weight Function Setting Unit)

A weight function calculation unit 14 determines the weight function $w(\varphi_m)$ from the measurement data obtained by the diffraction range/diffraction intensity acquisition unit 13. As the weight function, for example, a case of assuming the Gaussian distribution of Formula (7) will be described as an example.

[Math. 7]

$$w(\omega_m; \sigma_g) = \frac{1}{\sqrt{2\pi\sigma_g^2}} \exp\left(-\frac{\omega_m^2}{2\sigma_g^2}\right) \quad (7)$$

The determination of the weight function $w(\varphi_m)$ by the weight function setting unit 14 is realized by determining a parameter $\sigma_g$ that best fits the data acquired by the determined diffraction range/diffraction intensity acquisition unit 13 by calculation using the CPU 3 and storing the obtained parameter in the main storage device 5. An arbitrary function can be used as the weight function, and for example, when a certain angular range is set without performing the rocking curve measurement, another function such as a continuous uniform distribution function may be used.

(Randomly Oriented Sample X-ray Diffraction Profile Acquisition Unit)

A randomly oriented sample X-ray diffraction profile acquisition unit 15 acquires an X-ray diffraction profile of a randomly oriented sample having the same composition and structure as the measurement sample. The acquisition of the randomly oriented sample X-ray profile by the randomly oriented sample X-ray diffraction profile acquisition unit 15 is realized, for example, by the user reading measurement data recorded as a file in the auxiliary storage device 4 via the input device 8 or, for example, an ICCD database or the like to the main storage device 5.

(Existence Ratio Calculation Unit)

An existence ratio calculation unit 16 calculates an existence ratio $S^0$ of the particles whose crystal plane are oriented in the direction corresponding to each diffraction angle of the randomly oriented sample from the following equation using $\varphi_m$ calculated by the angle calculation unit formed by the orientation plane and the crystal plane corresponding to the diffraction peak of interest and $w(\varphi_m)$ calculated by the weight function calculation unit 14.

[Math. 8]

$$S^0 = \int w(\varphi_m) \sin \varphi_m d\varphi_m / 2\pi \quad (8)$$

Using the above equation, all the diffraction angles used to obtain the orientation degree distribution are calculated using the CPU 3 and the result is stored in the main storage device 5.

(X-ray Diffraction Profile/Diffraction Intensity Map Acquisition Unit)

An X-ray diffraction profile/diffraction intensity map acquisition unit 17 acquires, for example, an X-ray diffraction profile of a sample for measuring an orientation degree distribution measured using an X-ray diffraction (XRD) device, or a diffraction intensity map measured using a device capable of irradiating a minute site of the sample with X-rays, such as a micro-focal X-ray source, as an X-ray source. In the present specification, the "diffraction intensity map" refers to an intensity ratio of each diffraction peak obtained by X-ray diffraction measurement in which irradiation position information is added to an X-ray diffraction profile. The acquisition of the X-ray diffraction profile/diffraction intensity map by the X-ray diffraction profile/diffraction intensity map acquisition unit 17 is realized, for example, by the user reading the X-ray diffraction profile recorded as a file in the auxiliary storage device 4 via the input device 7 to the main storage device 5.

(Orientation Degree Distribution Function Setting Unit)

An orientation degree distribution function setting unit 18 sets the orientation degree distribution function $f(\varphi_m)$ by assuming the distribution shape of the orientation degree distribution. Setting of the orientation degree distribution function by the orientation degree distribution function setting unit 18 is realized, for example, by reading the orientation degree distribution function recorded in the calculation program stored in the auxiliary storage device 4 to the main storage device 5. An arbitrary equation can be set as the orientation degree distribution function $f(\varphi_m)$, but it is desirable to use a distribution function capable of sufficiently simulating an actual orientation degree distribution.

(Orientation Degree Distribution Analysis Unit)

An orientation degree distribution analysis unit 19 calculates the orientation degree distribution using the CPU 3 on the basis of the angle $\varphi_m$ formed by the orientation plane recorded in the main storage device 5 and the crystal plane corresponding to the diffraction peak of interest at the diffraction angle $\theta_i$, the weight function $w(\varphi_m)$, the existence ratio $S_i$ of the particles facing the direction of the angle $\varphi_m$ in the randomly oriented sample, the information on the diffraction angle corresponding to a certain crystal plane and the relative intensity thereof acquired by the X-ray diffraction profile/diffraction intensity map acquisition unit 17, or the information on the diffraction intensity map.

Figure 3:
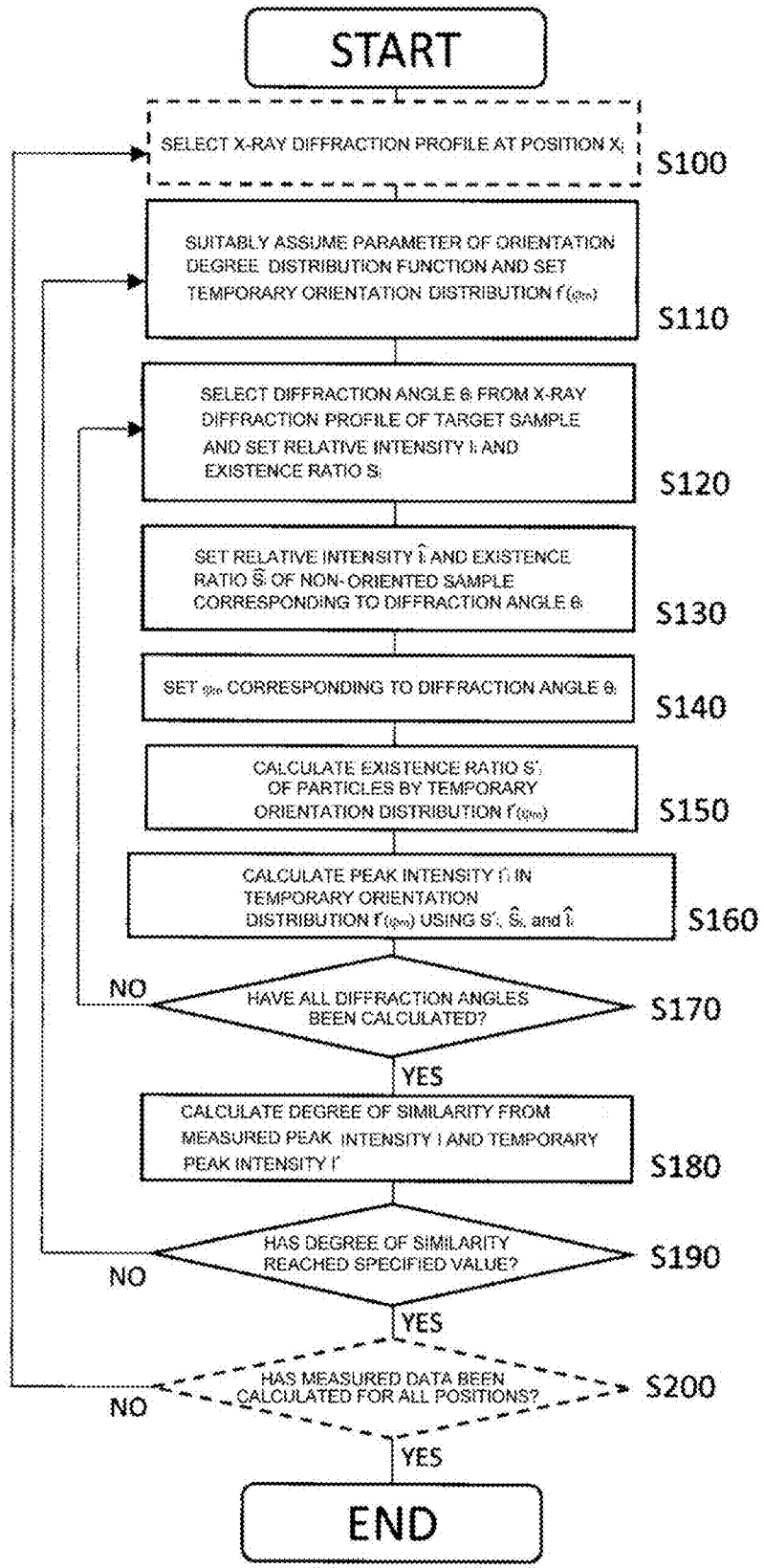
FIG. 3 is a flowchart illustrating details of an operation of an orientation degree distribution analysis unit.

Details of the operation of the orientation degree distribution analysis unit 19 will be described with reference to the flowchart illustrated in FIG. 3, and an example of processing will be described. Steps S100 and S200 indicated by dotted lines are steps necessary only when the diffraction intensity map measured using the micro-focal X-ray source is stored in the main storage device 5 in the X-ray profile acquisition unit 15 in FIG. 2.

When the data acquired by the X-ray diffraction profile/diffraction intensity map acquisition unit 17 is a diffraction intensity map, a j-th position in the diffraction intensity map is selected and set as $X_j$ in step S100.

Next, in step S110, the auxiliary variable of $f(\varphi_m)$ is also provisionally determined, and temporarily stored in the main storage device 5 as a temporary orientation degree distribution function $f^*(\varphi_m)$.

Next, in step S120, the diffraction angle $\theta_i$ of the i-th peak is selected from the X-ray diffraction profile of the sample to be measured, which is stored in the main storage device 5 by the X-ray diffraction profile/diffraction intensity map acquisition unit 17, and the relative intensity $I_i$ and the existence ratio $S_i$ are set.

Next, in step S130, the relative intensity of the randomly oriented sample corresponding to the diffraction angle $\theta_i$ set in step S120 is selected from the data stored in the main storage device 5 by the randomly oriented sample X-ray diffraction profile acquisition unit 15 and the existence ratio calculation unit 16, and is set as $I^0_i$ and $S^0_i$, respectively.

Next, in step S140, $\varphi_m$ corresponding to the diffraction angle $\theta_i$ selected in step S120 is selected and set. As $\varphi_m$, a value calculated by the angle calculation unit 12 formed by the orientation plane and the crystal plane corresponding to the diffraction peak of interest and stored in the main storage device 5 is used.

Next, in step S150, from the temporary orientation degree distribution function $f^*(\varphi_m)$ stored in the main storage device 5 in step S110, a particle existence ratio $S^*_i$ at which the angle formed by the orientation plane and the crystal plane corresponding to the diffraction peak of interest is $\varphi_m$ is calculated from the following equation and stored in the main storage device 5.

[Math. 9]

$$S_i^* = \int w(\varphi_m) f(\varphi_m) d\varphi_m \quad (9)$$

Next, in step S160, the peak intensity $I^*_i$ at $f^*(\varphi_m)$ is calculated from the following equation using $S^*_i$, $S^0_i$, and $I^0_i$ calculated in steps S130 and S150.

[Math. 10]

$$I_i^* = \frac{S_i^*}{S_i^0} I_i^0 \quad (10)$$

In step S170, it is determined whether the calculations in steps S120 to S160 have been performed for the peak data of all diffraction angles input to the orientation degree distribution analyzer 1, and if all the calculations have been performed, step S180 is performed, and if not, step S120 is performed.

For the peak data of all diffraction angles, the peak intensity $I^*_i$ predicted from the temporary orientation degree distribution function $f^*(\varphi_m)$ is calculated, and then, in step S180, a degree of the similarity between the predicted peak intensity group $(I^*_1, I^*_2, I^*_3, \ldots, I^*_n)$ and the actually measured peak intensity group $(I_1, I_2, I_3, \ldots, I_n)$ is calculated. For example, the following normalized residual sum of squares (SSR) can be used to calculate the degree of the similarity.

[Math. 11]

$$SSR = \sum_{i=1}^{n} \frac{(I_i - I_i^*)^2}{\sum I_i^2} \quad (11)$$

Subsequently, in step S190, it is determined whether or not the degree of the similarity calculated in S180 has reached a specified value, and when the similarity has reached the specified value, the orientation degree distribution function $f^*(\varphi_m)$ assumed at that time is used as the orientation degree distribution. In this case, it is considered that the difference between the peak intensity values is sufficiently small. In a case where the SSR is used for calculating the degree of the similarity, for example, a value of about $5 \times 10^{-3}$ to $5 \times 10^{-6}$ can be used as the specified value. The specified value is desirably set according to necessary calculation accuracy.

In a case where the data acquired by the X-ray diffraction profile/diffraction intensity map acquisition unit 17 is a diffraction intensity map, it is determined in step S200 whether calculation has been performed for all the positions, and in a case where calculation has not been performed for all the positions, step S100 is performed.

When there are a plurality of compositions (having different crystal structures) for which the orientation degree distribution is to be measured in the sample, the above calculation is repeated for each composition to determine the orientation degree distribution function $f(\varphi_m)$.

(Orientation Degree Distribution/Average Orientation Degree/Orientation Degree Space Map Output Unit)

An orientation degree distribution/average orientation degree/orientation degree space map output unit 20 displays the orientation degree distribution analyzed by the orientation degree distribution analysis unit 19 on the X-ray diffraction profile, and when the data stored in the main storage device 5 in the diffraction intensity map acquisition unit 17 is the diffraction intensity map, the orientation degree spatial map on the output device 10 such as a display. In the present specification, the "spatial map of orientation degree distribution" refers to a diagram in which the orientation degree and the position thereof are associated with each other. The orientation degree distribution/average orientation degree/orientation degree space map output unit 20 is realized when the CPU 3 performs processing of reading the analysis result of the orientation degree distribution function $f(\varphi_m)$ from the auxiliary storage device 4 or the like and displaying the analysis result on the output device 10 such as a display, and the display displays the analysis data.

EXAMPLES

Example 1

An example in which the orientation degree distribution calculation of the $Sm_2Fe_{17}N_3$ bonded magnet is performed using the above orientation degree distribution calculation method will be described.

(Calculation of Angle $\varphi_m$ Formed by Orientation Plane and Crystal Plane Corresponding to Diffraction Peak of Interest)

According to a PDF card of $Sm_2Fe_{17}N_3$; (ICDD Card No.: 00-048-1790) (hereinafter, referred to as Non Patent Literature 2), the crystal structure of $Sm_2Fe_{17}N_3$ is a rhombohedral crystal system, and the lattice constants are a=8.74 and c=12.66, respectively. From this data, Table 1 shows the results of calculating the angle ($\varphi_m$) formed by the orientation plane (in the case of this example, the (001) plane orthogonal to the c-axis which is the axis of easy magnetization) calculated using Formula (5) and the crystal plane corresponding to the diffraction peak of interest. In Table 1, calculation results for only peaks between diffraction angles of 30 to 60 degrees among certain diffraction peaks described in the PDF card are described.

TABLE 1

| 2θ (°, Co) | Intensity | h k l | $\varphi_m$ (°) |
|---|---|---|---|
| 34.27 | 29 | (113) | 44.00 |
| 35.68 | 9 | (104) | 22.69 |
| 37.37 | 13 | (211) | 77.27 |
| 40.12 | 6 | (122) | 65.68 |
| 41.51 | 39 | (300) | 90.00 |
| 43.22 | 20 | (024) | 39.91 |
| 48.33 | 100 | (220) | 90.00 |
| 48.81 | 80 | (303) | 59.13 |
| 49.84 | 19 | (214) | 47.89 |
| 50.19 | 28 | (006) | 0.00 |
| 54.88 | 15 | (223) | 62.63 |
| 56.27 | 6 | (125) | 41.51 |
| 57.09 | 4 | (401) | 81.50 |
| 59.12 | 5 | (042) | 73.36 |

(Determination of Weight Function $w(\varphi_m)$)

In addition, in order to determine the weight function $w(\varphi_m)$, rocking curve measurement was performed in this example. A commercially available $Sm_2Fe_{17}N_3$ fine powder (average particle diameter: about 2 μm) was mixed with an epoxy resin and then filled in a nonmagnetic mold, and then cured in a static magnetic field of 2.2 T to prepare a bonded magnet in which the $Sm_2Fe_{17}N_3$ fine powder was oriented substantially parallel to the magnetic field direction.

Figure 4:
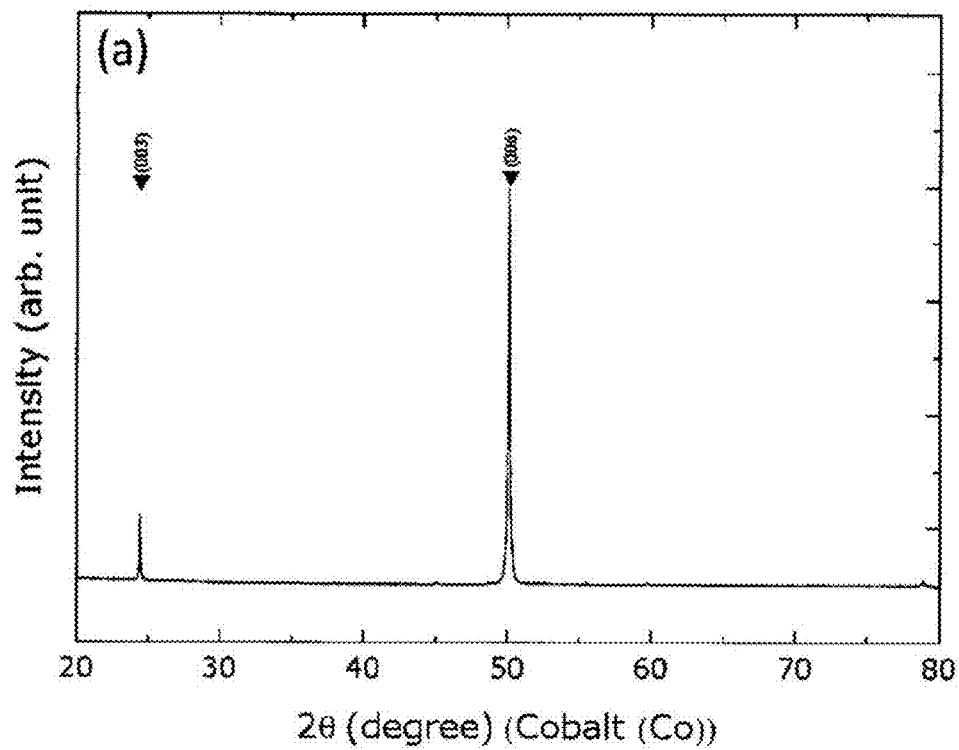
FIG. 4 is a view illustrating a rocking curve of a nearly completely oriented $Sm_2Fe_{17}N_3$ bonded magnet.
Figure 4:
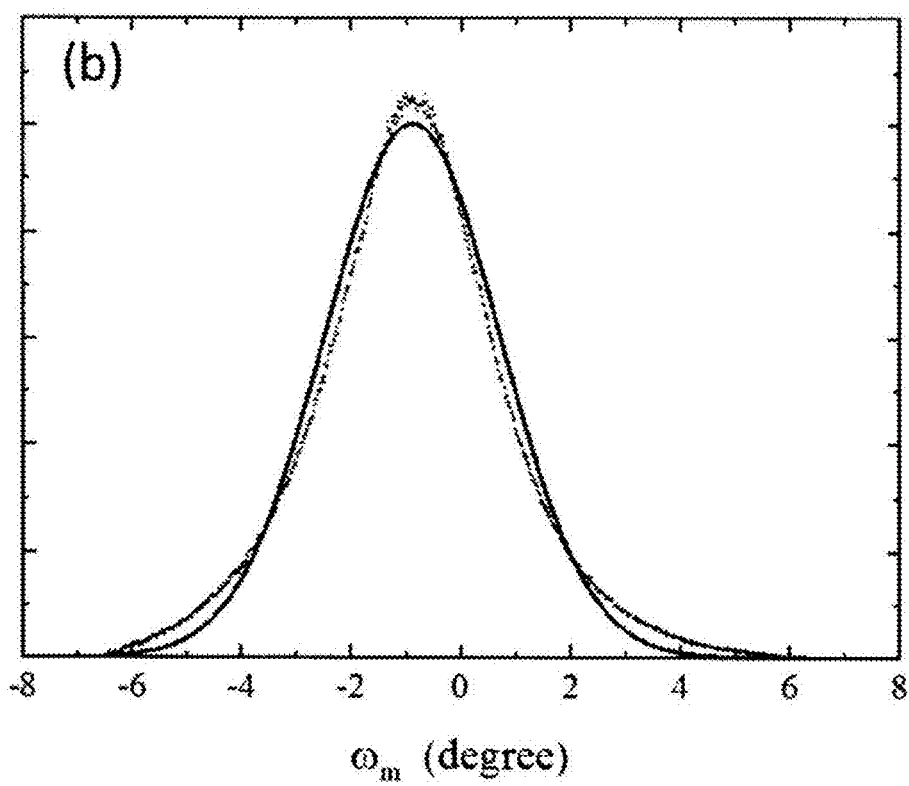

FIG. 4(a) is an XRD profile obtained by polishing one surface of the obtained bonded magnet and measuring the polished bonded magnet using an X-ray tube of Co as an anode material. The vertical axis represents the measured intensity (arbitrary unit). Only diffraction peaks of the (003) plane and the (006) plane of the orientation plane were observed, and it was confirmed that a bonded magnet almost completely oriented could be prepared. The rocking curve of the (006) plane is shown in FIG. 4(b). A function determined on the assumption that the functional form of the obtained measurement data is the Gaussian distribution indicated by Formula (7) is indicated by a solid line in FIG. 4(b). From this result, the auxiliary variable $\sigma_g$ in Formula (7) was calculated as 3.19, and the weight function $w(\varphi_m)$ was determined.

(Existence Ratio of Particles Whose Crystal Planes are Oriented in Direction Corresponding to Diffraction Angle θ in Randomly Oriented Sample)

The existence ratio S of the particles whose crystal planes are oriented in the direction corresponding to the diffraction angle θ in the randomly oriented sample is calculated as shown in Table 2 from Formula (8) using the data of Non Patent Literature 2 described above.

TABLE 2

| 2θ (°, Co) | h k l | S |
|---|---|---|
| 34.27 | (113) | 0.002421 |
| 35.68 | (104) | 0.001344 |
| 37.37 | (211) | 0.003399 |
| 40.12 | (122) | 0.003176 |
| 41.51 | (300) | 0.000871 |
| 43.22 | (024) | 0.002236 |
| 48.33 | (220) | 0.000871 |
| 48.81 | (303) | 0.002991 |
| 49.84 | (214) | 0.002585 |
| 50.19 | (006) | 0.000019 |
| 54.88 | (223) | 0.003095 |
| 56.27 | (125) | 0.002310 |
| 57.09 | (401) | 0.003447 |
| 59.12 | (042) | 0.003339 |

(Determination of Orientation Degree Distribution Function $f(\varphi_m)$)

For $f(\varphi_m)$, the orientation degree distribution can be calculated with high accuracy by using a distribution function capable of sufficiently simulating the orientation degree distribution of the sample to be measured. However, when an attempt is made to experimentally determine the functional form of the orientation degree distribution function, it is necessary to examine the crystal orientation of all the crystal grains constituting the magnet with respect to the magnet having various orientation degrees, and the number of crystal grains to be measured is too large, which is extremely difficult in practice. Therefore, as a method for examining the orientation directions of all the crystal grains constituting the magnet having various orientation degrees, in this example, the distribution of the orientation directions of the particles was analyzed using discrete element method simulation.

Figure 5:
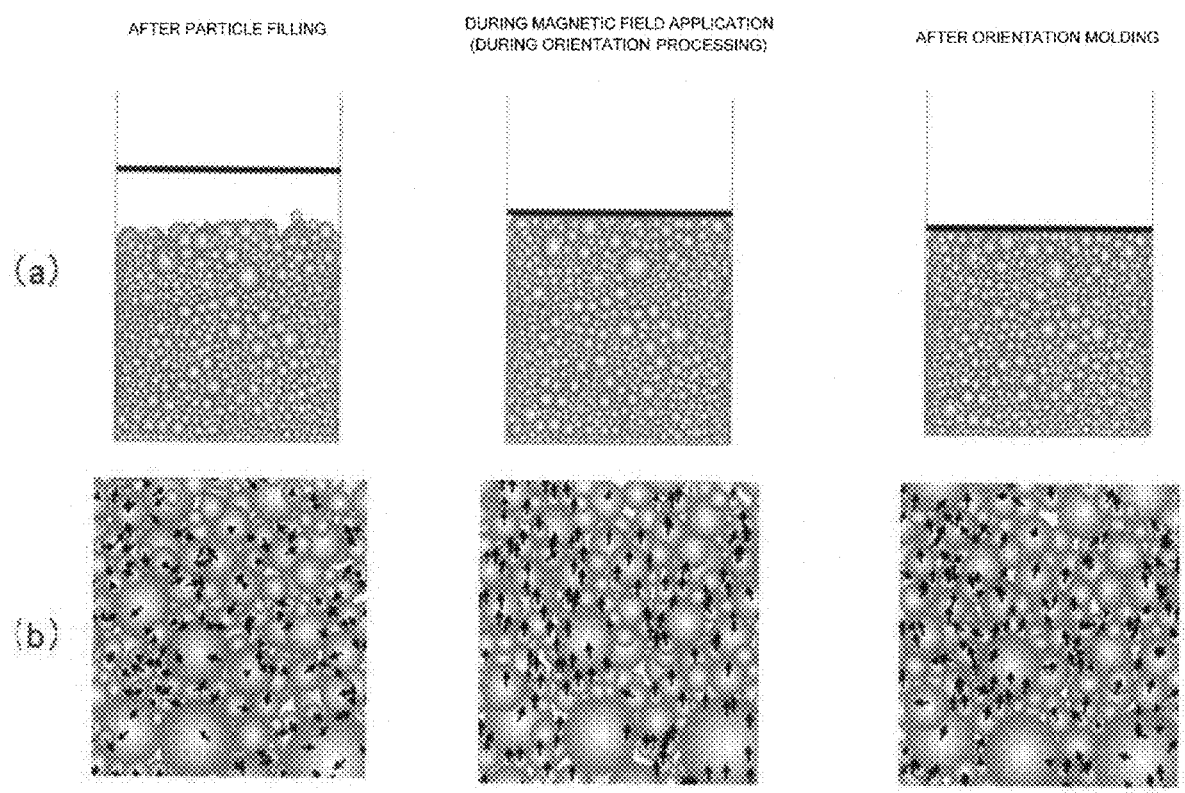
FIG. 5 is a view illustrating positions and crystal orientations of individual particles before orientation, during orientation, and after orientation.

FIG. 5 is an example of a result of analyzing the orientation process of the magnet using a simulation method in which a magnetic field analysis function is actually added to the discrete element method simulation.

FIG. 5(a) shows the positions of individual particles before orientation, during orientation, and after orientation, and FIG. 5(b) shows the crystal orientation of the particles with arrows. In the simulation of FIG. 5, the frictional force, the elastic force, the gravity force, and the magnetic force acting on the particles are taken into consideration, and a method was used which shows that the orientation phenomenon of the magnet can be analyzed with high accuracy by comparison with an experiment (see Non Patent Literatures 3 and 4). When this method is used in this way, it is possible to ascertain the orientations of all the crystal grains constituting the magnet which is difficult to observe in the experiment.

Figure 6:
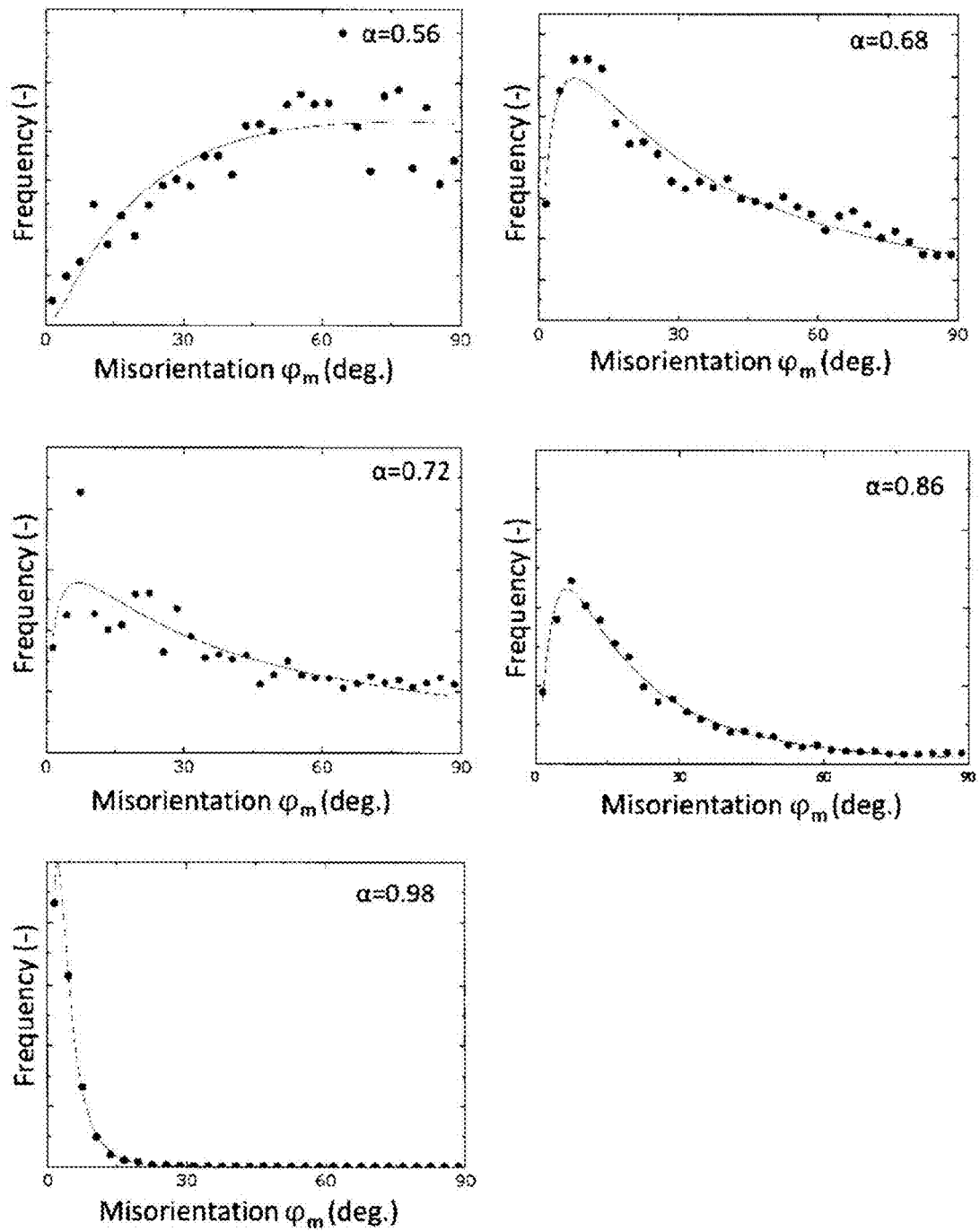
FIG. 6 is a view illustrating an orientation degree distribution of magnets having different orientation degrees obtained by computer simulation.

FIG. 6 illustrates the distribution of five different types of magnets having an orientation degree a of 0.56 to 0.98 prepared on a computer by performing simulation with different materials and orientation conditions using the methods of FIG. 5 and Non Patent Literatures 3 and 4, and calculating the angle $\varphi_m$ between the axis of easy magnetization and the crystal plane for all constituent particles of the magnet. It can be seen that the distribution of the orientation direction when the orientation degree is low (when the orientation degree is lower than 0.6) is close to the analysis solution shown in Formula (8), and the shape when the orientation degree is high (when the orientation degree is higher than 0.6) is close to the log-normal distribution. In Non Patent Literatures 5 and 6 in which the distribution of the orientation direction is examined by EBSD for a part of the region inside the neodymium magnet having a high orientation degree, it is pointed out that the distribution of the crystal orientation has a shape close to the normal distribution, and it is considered that the results of the numerical calculation shown in FIGS. 6 and 5 well represent the actual orientation state inside the magnet.

However, since the orientation directions of the crystal grains inside the magnet are always distributed between 0 degrees and 90 degrees, it is not possible to sufficiently simulate the actual orientation degree distribution if the orientation degree distribution function is assumed to be normal distribution and lognormal distribution in which a definition range is from $-\infty$ to $+\infty$ and from 0 to $+\infty$.

Therefore, in the present embodiment, the truncated log-normal distribution represented by the following formula is assumed as a functional form that has a definition range of 0 degrees to 90 degrees and can sufficiently simulate all orientation degree distributions obtained by numerical calculation of the orientation magnet.

[Math. 12]

$$f(\varphi_m; \mu, \sigma, \varphi_l, \varphi_u) = \frac{\sqrt{2} e^{-\frac{1}{2}\frac{1}{\sigma^2}\left(\ln\left(\frac{\varphi_m}{\mu}\right)\right)^2}}{-\sqrt{\pi}\sigma\left(\mathrm{erf}\left(\frac{1}{2}\frac{\sqrt{2}}{\sigma}\ln\left(\frac{\varphi_l}{\mu}\right)\right)-\mathrm{erf}\left(\left(\frac{1}{2}\frac{\sqrt{2}}{\sigma}\ln\left(\frac{\varphi_u}{\mu}\right)\right)\right)\right)\varphi_m} \quad (12)$$

Here, the auxiliary variables μ and σ are distributed between $\varphi_l \leq \varphi_m \leq \varphi_u$ with a scale parameter and a shape parameter, respectively. The functions erf and ln are respectively an error function and a natural logarithm. The result of approximation of the distribution in the orientation direction by Formula (12) is the solid line shown in FIG. 6. The average orientation degree of 0.56 to 0.98 is in good agreement with the experimental value in a wide range, and it can be seen that Formula (12) is a distribution function that can sufficiently simulate a wide range of orientation degree distribution from distribution close to random orientation to distribution close to complete orientation.

(Analysis of Orientation Degree Distribution)

Figure 7:
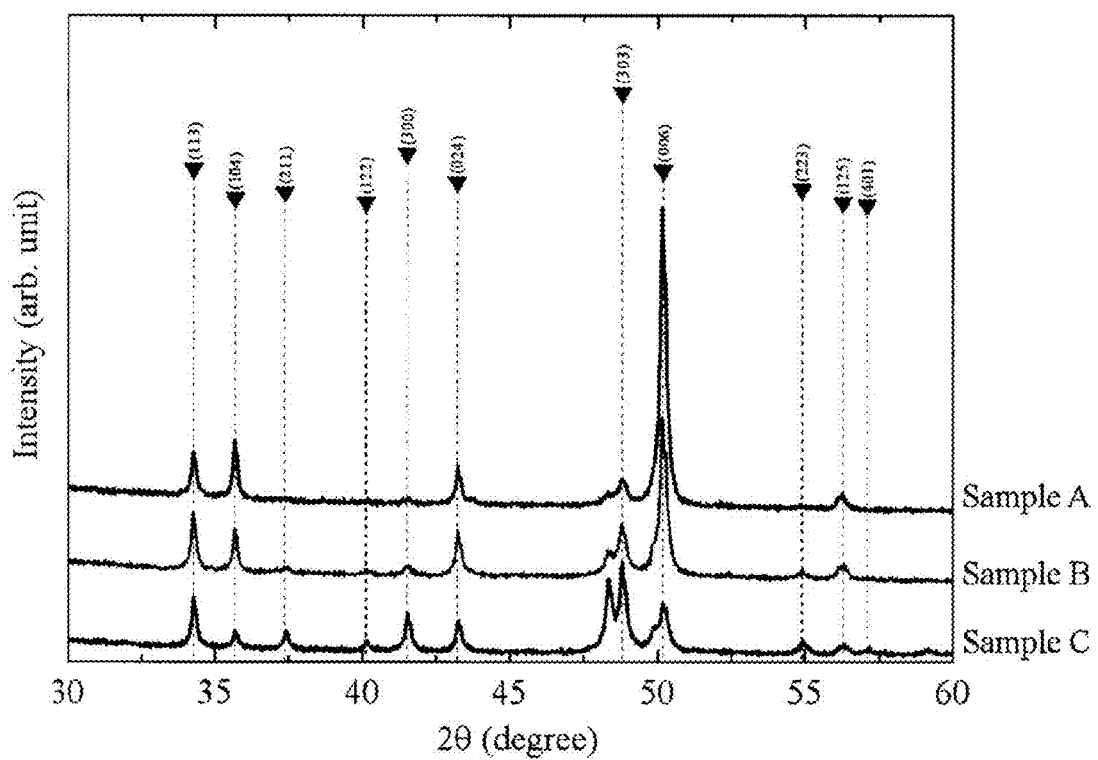
FIG. 7 is a view illustrating X-ray diffraction profiles of three $Sm_2Fe_{17}N_3$ bonded magnets having different orientation degrees.

FIG. 7 illustrates the results of X-ray diffraction profile measurement by an XRD apparatus using three cylindrical Sm$_2$Fe$_{17}$N$_3$ bonded magnets having different orientation degrees a and an X-ray tube whose anode material is Co. The vertical axis represents the measured intensity (arbitrary unit). For the bonded magnet used for the measurement, first, 0.7 g of commercially available Sm$_2$Fe$_{17}$N$_3$ fine powder (average particle diameter: about 2 μm) was filled in a cylindrical nonmagnetic mold having a diameter of 6 mm, and then a magnetic field was applied in a direction parallel to the press by a pulse magnetic field orienting machine to obtain a compact in which the magnet powder was oriented in the magnetic field direction. At this time, three molded bodies having different orientation degrees were prepared by changing the application conditions of the magnetic field. The obtained molded body was embedded in a resin, and one surface thereof was polished and measured.

Since diffraction peaks other than the (006) plane are observed in all the samples, the samples are not completely oriented. Sample A has the highest diffraction intensity of the (006) plane and the lowest intensity of the other peaks as compared with the other samples, and thus has the highest orientation degree among the samples used for the measurement this time. Conversely, Sample C is estimated to have the lowest orientation degree because the diffraction intensity of the (006) plane is the lowest and the intensities of the other peaks are high.

Figure 8:
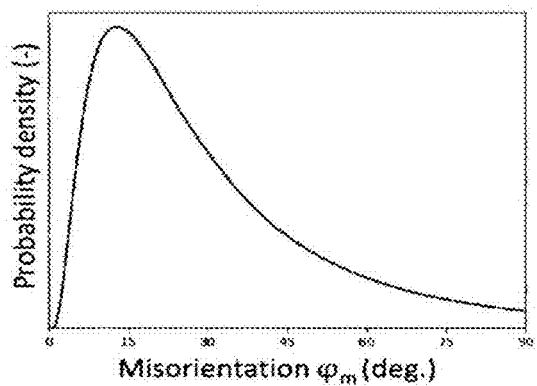
FIG. 8 is a view illustrating an orientation degree distribution of a $Sm_2Fe_{17}N_3$ bonded magnet obtained using an orientation degree distribution calculation method.
Figure 8:
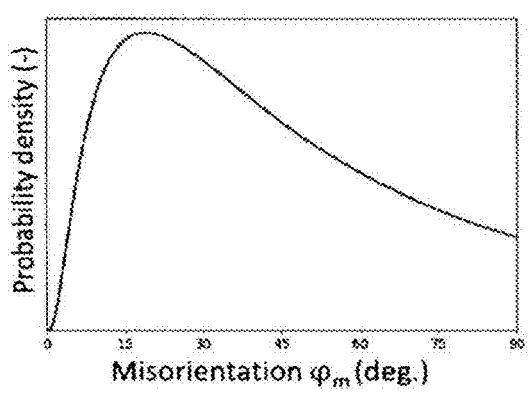
Figure 8:
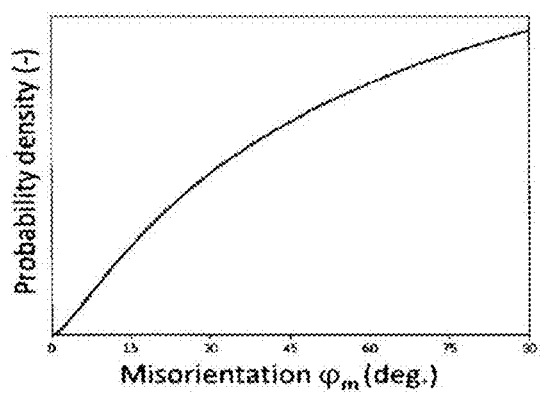

FIGS. 8(a) to 8(c) illustrate orientation degree distributions calculated using the orientation degree distribution calculation method for Samples A to C, respectively. The vertical axis represents a probability density. Table 3 shows the average orientation degree calculated from FIG. 8. A result consistent with the orientation degree predicted from the X-ray diffraction profile was obtained. This indicates that the present invention is very effective as a method for calculating an actual orientation degree distribution.

TABLE 3

| Sample Name | Average Orientation Degree |
|---|---|
| Sample A | 0.92 |
| Sample B | 0.81 |
| Sample C | 0.51 |

Figure 9:
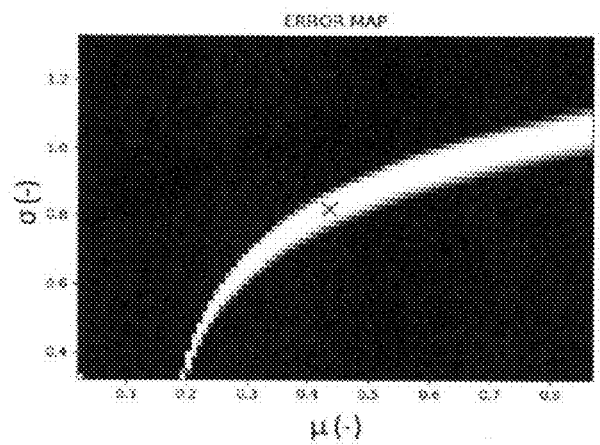
FIG. 9 is a map illustrating a relationship between auxiliary variables p and a of a truncated log-normal distribution and a normalized residual sum of squares.
Figure 9:
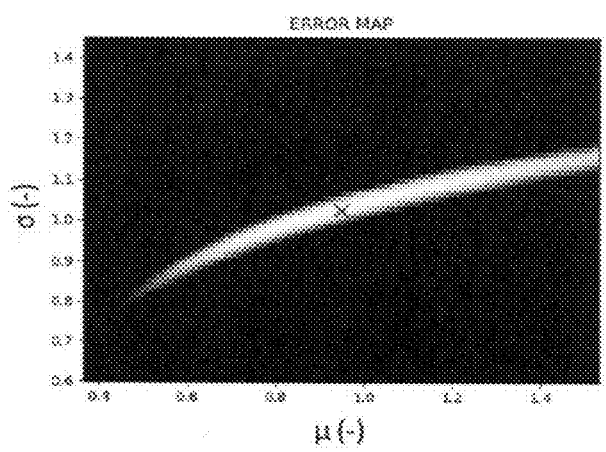
Figure 9:
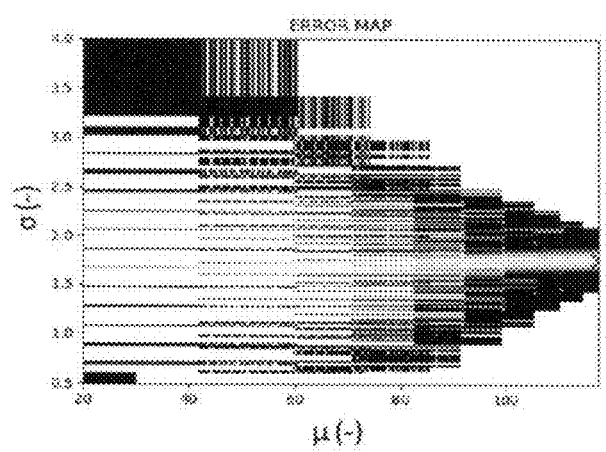

FIG. 9 illustrates a map distinguished by a residual sum of squares SSR with a vertical axis as a and a horizontal axis as p. The position indicated by x in the drawing means that the X-ray diffraction profile predicted from the measured X-ray diffraction profile and the temporarily determined orientation degree distribution is the closest value of the auxiliary variable. In all of the results, the point at which the SSR was the minimum converged to one point, and the values of SSR were $5 \times 10^{-3}$ or less. This means that the orientation degree distribution can be uniquely determined by using the calculation method of the present invention.

Example 2

A case where the same Sm$_2$Fe$_{17}$N$_3$ bonded magnet as that prepared in Example 1 is used as a measurement target, a diffraction intensity map is acquired using a micro-focal X-ray source, and spatial mapping of the orientation degree is performed will be described.

The measured sample was the same sample as Sample A in FIG. 7, the surface orthogonal to the orientation direction was manually polished with abrasive paper, and a part of the polished surface was measured using a micro-focal X-ray source (Panalytical Focusing X-ray lens 50 μm HR, hereinafter, referred to as a focusing lens).

The focusing lens is obtained by bundling several millions of glass capillaries each having a diameter of about 5 micrometers with light from an X-ray point light source, and is a device capable of obtaining a pseudo-parallel X-ray beam having a spot diameter of about 50 micrometers by guiding X-rays while totally reflecting the X-rays inside. The measured area was about 4 mm$^3$, and the measurement area was divided into 50 μm squares for measurement. The number of measurement points is 63 points in the vertical direction and 25 points in the horizontal direction, that is, a total of 1575 points.

Figure 10:
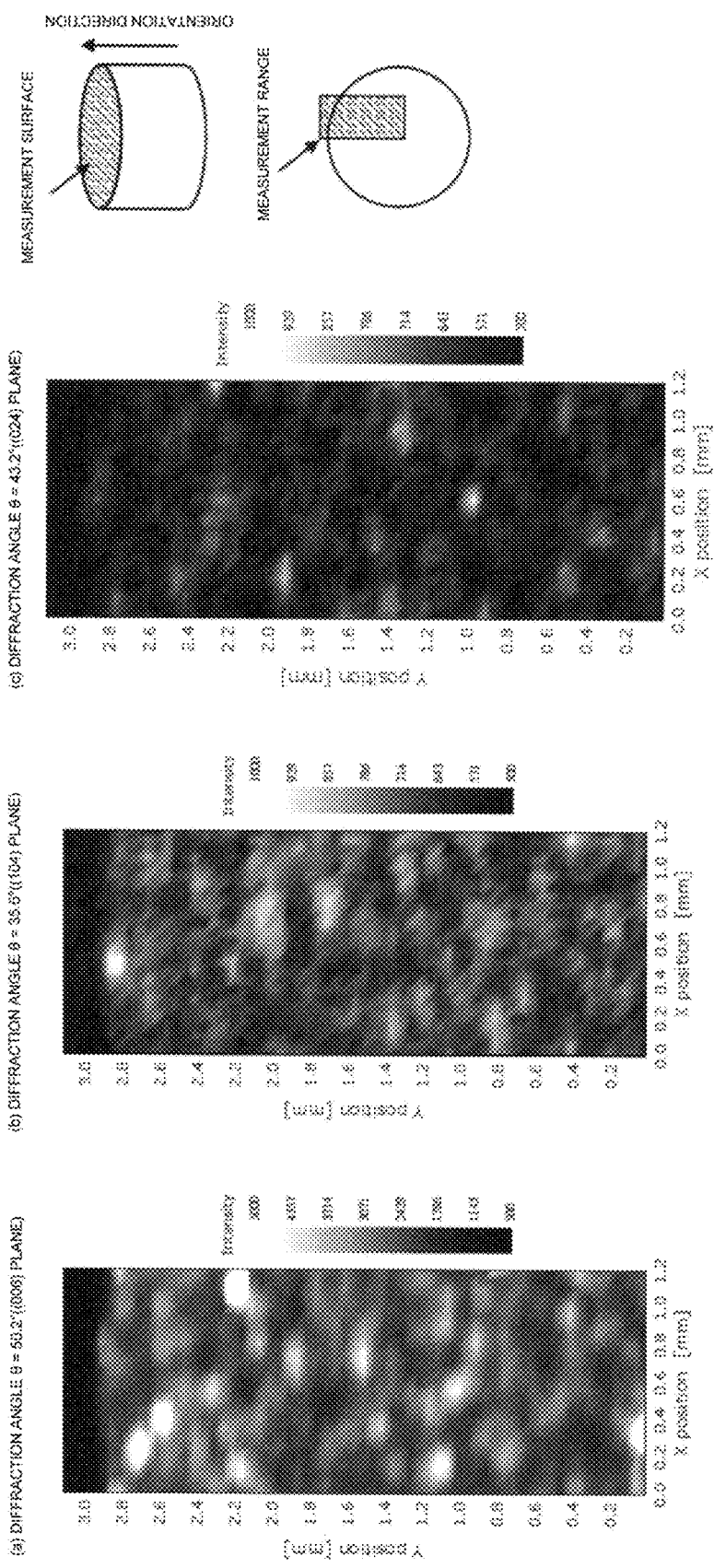
FIG. 10 is a diffraction intensity map at diffraction angles θ=50.2°, 35.6°, and 43.2° acquired using a micro-focal X-ray source.

FIGS. 10 (a) to (c) are diffraction intensity maps at diffraction angles θ=50.2°, 35.6°, and 43.2° (corresponding to (006) plane, (104) plane, and (024) plane, respectively) acquired using the micro-focal X-ray source, respectively. In the drawing, a region having a light color indicates a region having a high diffraction intensity, that is, a crystal plane corresponding to a diffraction angle and a direction of a measurement surface coincide with each other.

Figure 11:
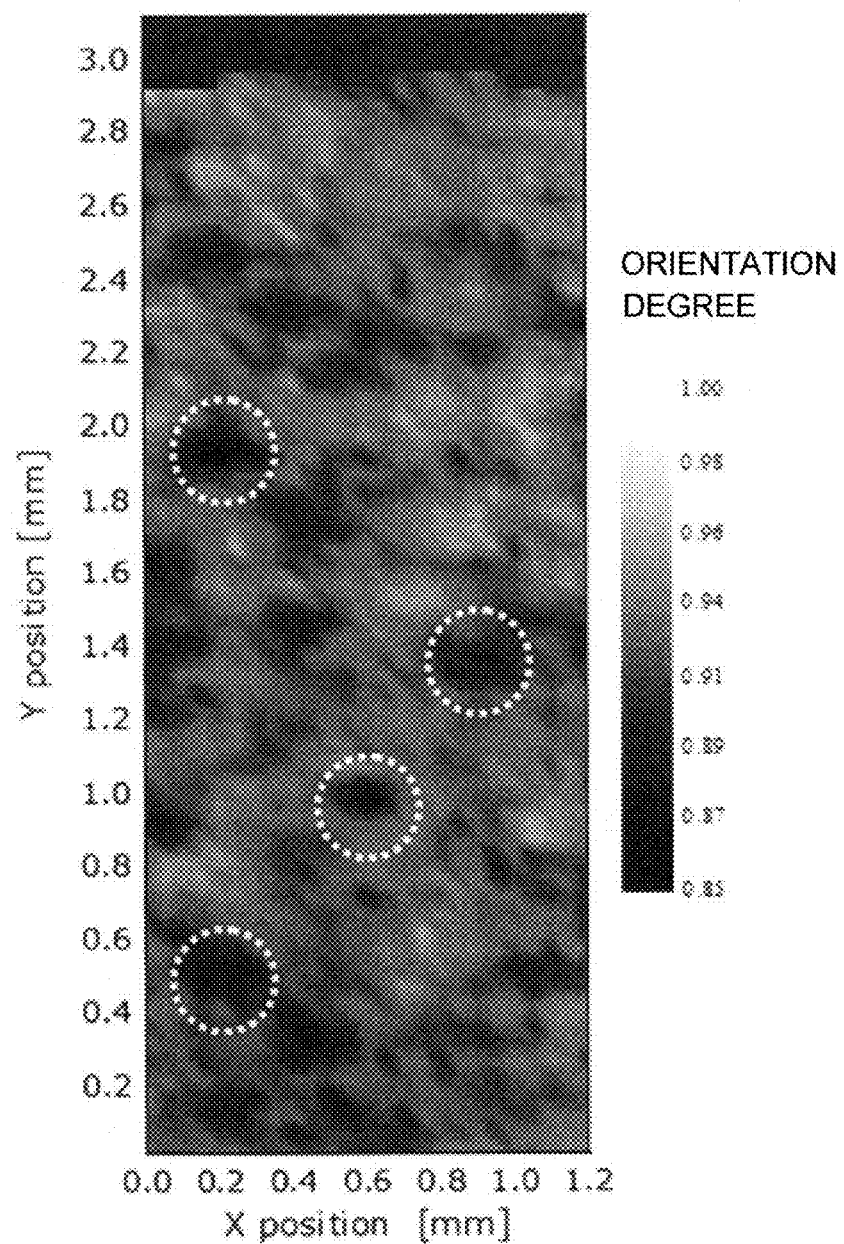
FIG. 11 is an orientation degree map created from the diffraction intensity map of FIG. 9.

FIG. 11 illustrates an orientation degree map calculated using the present invention from the data of FIG. 10. For the crystal structure information and the X-ray diffraction profile of the non-oriented sample, Non Patent Literature 2 was used as in Example 1, and for the orientation degree distribution function, the truncated log-normal distribution of Formula (12) was used. The results of FIG. 11 show that the orientation degree map can be created from a plurality of diffraction intensity maps using the present invention.

Figure 12:
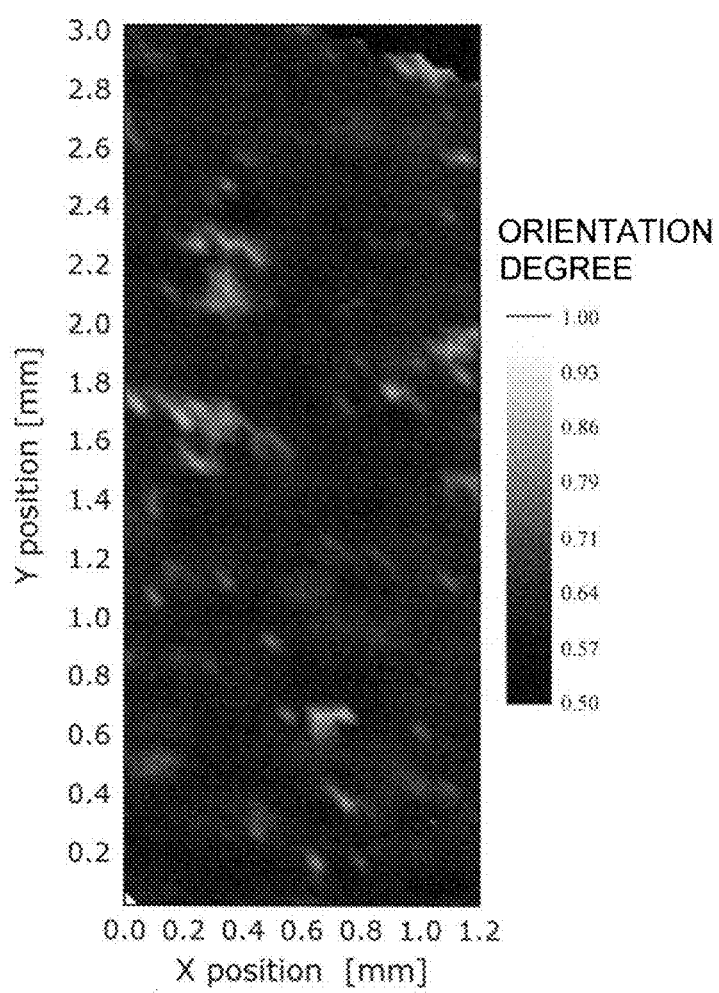
FIG. 12 is an orientation degree map of a sample having a low orientation degree calculated by the same method as in FIG. 11.

FIG. 12 illustrates an orientation degree map of a sample having a low orientation degree calculated by the same method as in FIG. 11. The lower part of FIG. 12 corresponds to the vicinity of the center of the sample. It was found that the low orientation region was widely distributed from the center to the outside of the sample. In addition, also in FIG. 11 which is the measurement result of the highly oriented sample, it was found for the first time that the orientation degree was not homogeneous, and portions having a low orientation degree (regions surrounded by circles) were scattered in an island shape inside, suggesting the possibility of further improving the orientation degree.

This indicates that a guideline for improving the orientation degree can be obtained by visualizing the orientation degree map using the present invention.

Note that the above examples merely show specific examples for calculating the orientation degree distribution and the orientation degree map according to the present invention, and the technical scope of the present invention should not be interpreted in a limited manner by these examples. The present invention can be implemented in various forms without departing from the technical idea or the main features thereof.

INDUSTRIAL APPLICABILITY

According to the orientation distribution calculation method of the present invention, since the orientation degree distribution and the orientation degree map can be easily calculated from the X-ray diffraction profile of the sample to be measured, the X-ray diffraction profile of the non-oriented sample, and the crystal structure information of the sample to be measured, the method is effective for various materials in which properties such as electrical and thermal conductivity, magnetic properties, piezoelectricity, optical transparency, and magnetic properties change depending on the crystal orientation. Therefore, it can be expected to be applied to a wide range of fields such as various magnetic materials such as permanent magnet materials, high-frequency materials, and soft magnetic materials, various ceramic materials whose characteristics change due to crystal orientation, such as honeycomb ceramics for automobile exhaust gas, and fiber-reinforced plastics.

REFERENCE SIGNS LIST 1 orientation degree distribution analyzer
2 information processing apparatus
3 central information processing unit (CPU)
4 auxiliary storage device
5 main storage device
6 input/output circuit
7 input data
8 input device
9 output result
10 output device
11 crystal structure information acquisition unit
12 angle calculation unit formed by orientation plane and crystal plane corresponding to diffraction peak of interest
13 diffraction range/diffraction sensitivity acquisition unit
14 weight function calculation unit
15 randomly oriented sample X-ray diffraction profile acquisition unit
16 existence ratio calculation unit
17 X-ray diffraction profile/diffraction intensity map acquisition unit
18 orientation degree distribution function setting unit
19 orientation degree distribution acquisition unit
20 orientation degree distribution/average orientation degree/orientation degree space map output unit

The invention claimed is:

1. An orientation degree distribution analysis method of calculating an orientation degree distribution from a measurement result of X-ray diffraction and crystal structure information of a measurement target using an information processing apparatus including a main storage device and a central processing unit (CPU), the orientation degree distribution analysis method comprising:

a first step of acquiring first information which is the crystal structure information of the measurement target, second information on an intensity ratio of each diffraction peak of the measurement target and a crystal plane corresponding to each diffraction peak of the measurement target by X-ray diffraction measurement, each diffraction peak of the measurement target being obtained from an X-ray diffraction profile of the measurement target obtained by an X-ray diffraction device, third information on a diffraction range and a diffraction sensitivity, and fourth information on an intensity ratio of each diffraction peak of a randomly oriented sample and a crystal plane corresponding to each diffraction peak of the randomly oriented sample, each diffraction peak of the randomly oriented sample being obtained from an X-ray diffraction profile of the randomly oriented sample obtained by an X-ray diffraction profile acquisition unit, and inputting the first information, the second information, the third information, and the fourth information to the main storage device;

a second step of calculating an angle defined by an orientation plane and a crystal plane corresponding to a diffraction peak of interest from the first information, the second information, the third information, and the fourth information;

a third step of calculating an existence ratio of particles with crystal planes oriented in directions corresponding to respective diffraction angles of the randomly oriented sample and storing the existence ratio in the main storage device;

a fourth step of assuming a distribution shape of an orientation degree distribution and setting an orientation degree distribution function; and a fifth step of calculating the orientation degree distribution based on the first information, the second information, the third information, the fourth information, the angle, the existence ratio, and the orientation degree distribution function.

2. The orientation degree distribution analysis method according to claim 1, wherein the fifth step further comprises calculating a relative intensity of each diffraction peak of the measurement target based on the orientation degree distribution function.

3. The orientation degree distribution analysis method according to claim 1, wherein:
the first step further comprises acquiring the intensity ratio of each diffraction peak of the measurement target by the X-ray diffraction measurement in which irradiation position information is added to the X-ray diffraction profile of the measurement target using the X-ray diffraction device which is capable of irradiating a portion of the measurement target with X-rays; and
the orientation degree distribution analysis method further comprises a sixth step of outputting a spatial map of the orientation degree distribution in which an orientation degree and a position thereof are associated with each other.

4. The orientation degree distribution analysis method according to claim 2, wherein:
the first step further comprises acquiring a relative intensity of each diffraction peak of the measurement target; and
the fifth step further comprises calculating a degree of similarity by comparing the relative intensity of each diffraction peak of the measurement target which has been calculated with the relative intensity of each diffraction peak of the measurement target which has been acquired.

5. The orientation degree distribution analysis method according to claim 4,
wherein the fifth step further comprises calculating the degree of similarity by changing values of auxiliary variables of the orientation degree distribution function; and determining the orientation degree distribution function of the measurement target having a minimum degree of similarity.

6. The orientation degree distribution analysis method according to claim 3,
wherein the X-ray diffraction device is a micro-focal X-ray source.

7. An orientation degree distribution analyzer for calculating an orientation degree distribution from a measurement result of X-ray diffraction and crystal structure information of a measurement target, the orientation degree distribution analyzer comprising:
an information processing apparatus including a main storage device and a central processing unit (CPU),
wherein the CPU is configured to function as:
an acquisition unit configured to acquire first information which is the crystal structure information of the measurement target, second information on an intensity ratio of each diffraction peak of the measurement target and a crystal plane corresponding to each diffraction peak of the measurement target by X-ray diffraction measurement, each diffraction peak of the measurement target being obtained from an X-ray diffraction profile of the measurement target obtained by an X-ray diffraction device, third information on a diffraction range and a diffraction sensitivity, and fourth information on an intensity ratio of each diffraction peak of a randomly oriented sample and a crystal plane corresponding to each diffraction peak of the randomly oriented sample, and input the first information, the second information, the third information, and the fourth information to the main storage device;
an angle calculation unit configured to calculate an angle defined by an orientation plane and a crystal plane corresponding to a diffraction peak of interest from the first information, the second information, the third information, and the fourth information;
an existence ratio calculation unit configured to calculate an existence ratio of particles with crystal planes oriented in directions corresponding to respective diffraction angles of the randomly oriented sample and store the existence ratio in the main storage device;
an orientation degree distribution function setting unit configured to assume a distribution shape of an orientation degree distribution and set an orientation degree distribution function; and
an orientation degree distribution analysis unit configured to calculate the orientation degree distribution based on the first information, the second information, the third information, the fourth information, the angle, the existence ratio, and the orientation degree distribution function.

8. The orientation degree distribution analyzer according to claim 7,
wherein the orientation degree distribution analysis unit is configured to calculate a relative intensity of each diffraction peak of the measurement target based on the orientation degree distribution function.

9. The orientation degree distribution analyzer according to claim 7, wherein:
the acquisition unit is further configured to acquire the intensity ratio of each diffraction peak of the measurement target by the X-ray diffraction measurement in which irradiation position information is added to the X-ray diffraction profile of the measurement target using the X-ray diffraction device which is capable of irradiating a portion of the measurement target with X-rays; and
the orientation degree distribution analyzer further comprises an output device configured to output a spatial map of the orientation degree distribution in which an orientation degree and a position thereof are associated with each other.

10. The orientation degree distribution analyzer according to claim 8, wherein:
the acquisition unit is further configured to acquire a relative intensity of each diffraction peak of the measurement target; and
the orientation degree distribution analysis unit is further configured to calculate a degree of similarity by comparing the relative intensity of each diffraction peak of the measurement target which has been calculated with the relative intensity of each diffraction peak of the measurement target which has been acquired.

11. The orientation degree distribution analyzer according to claim 10,
wherein the orientation degree distribution analysis unit is configured to calculate the degree of similarity by changing values of auxiliary variables of the orientation degree distribution function; and determine the orientation degree distribution function of the measurement target having a minimum degree of similarity.

12. The orientation degree distribution analyzer according to claim 9,
wherein the X-ray diffraction device is a micro-focal X-ray source.

13. A non-transitory computer-readable medium having stored thereon an orientation degree distribution analysis program for calculating an orientation degree distribution from a measurement result of X-ray diffraction and crystal structure information of a measurement target using an information processing apparatus including a main storage device and a central processing unit (CPU), the orientation degree distribution analysis program causing a computer to execute:
- a first step of acquiring first information which is the crystal structure information of the measurement target, second information on an intensity ratio of each diffraction peak of the measurement target and a crystal plane corresponding to each diffraction peak of the measurement target by X-ray diffraction measurement, each diffraction peak of the measurement target being obtained from an X-ray diffraction profile of the measurement target obtained by an X-ray diffraction device, third information on a diffraction range and a diffraction sensitivity, and fourth information on an intensity ratio of each diffraction peak of a randomly oriented sample and a crystal plane corresponding to each diffraction peak of the randomly oriented sample, each diffraction peak of the randomly oriented sample being obtained from an X-ray diffraction profile of the randomly oriented sample obtained by an X-ray diffraction profile acquisition unit, and inputting the first information, the second information, the third information, and the fourth information to the main storage device;
- a second step of calculating an angle defined by an orientation plane and a crystal plane corresponding to a diffraction peak of interest from the first information, the second information, the third information, and the fourth information;
- a third step of calculating an existence ratio of particles with crystal planes oriented in directions corresponding to respective diffraction angles of the randomly oriented sample and storing the existence ratio in the main storage device;
- a fourth step of assuming a distribution shape of an orientation degree distribution and setting an orientation degree distribution function; and
- a fifth step of calculating the orientation degree distribution based on the first information, the second information, the third information, the fourth information, the angle, the existence ratio, and the orientation degree distribution function.

14. The non-transitory computer-readable medium according to claim 13,
wherein the fifth step further comprises calculating a relative intensity of each diffraction peak of the measurement target based on the orientation degree distribution function.

15. The non-transitory computer-readable medium according to claim 13, wherein:
the first step further comprises acquiring the intensity ratio of each diffraction peak of the measurement target by the X-ray diffraction measurement in which irradiation position information is added to the X-ray diffraction profile of the measurement target using the X-ray diffraction device which is capable of irradiating a portion of the measurement target with X-rays; and
the orientation degree distribution analysis method further comprises a sixth step of outputting a spatial map of the orientation degree distribution in which an orientation degree and a position thereof are associated with each other.

16. The non-transitory computer-readable medium according to claim 14, wherein:
the first step further comprises acquiring a relative intensity of each diffraction peak of the measurement target; and
the fifth step further comprises calculating a degree of similarity by comparing the relative intensity of each diffraction peak of the measurement target which has been calculated with the relative intensity of each diffraction peak of the measurement target which has been acquired.

17. The non-transitory computer-readable medium according to claim 16,
wherein the fifth step further comprises calculating the degree of similarity by changing values of auxiliary variables of the orientation degree distribution function; and determining the orientation degree distribution function of the measurement target having a minimum degree of similarity.

18. The non-transitory computer-readable medium according to claim 15,
wherein the X-ray diffraction device is a micro-focal X-ray source.

* * * * *